2,557,227

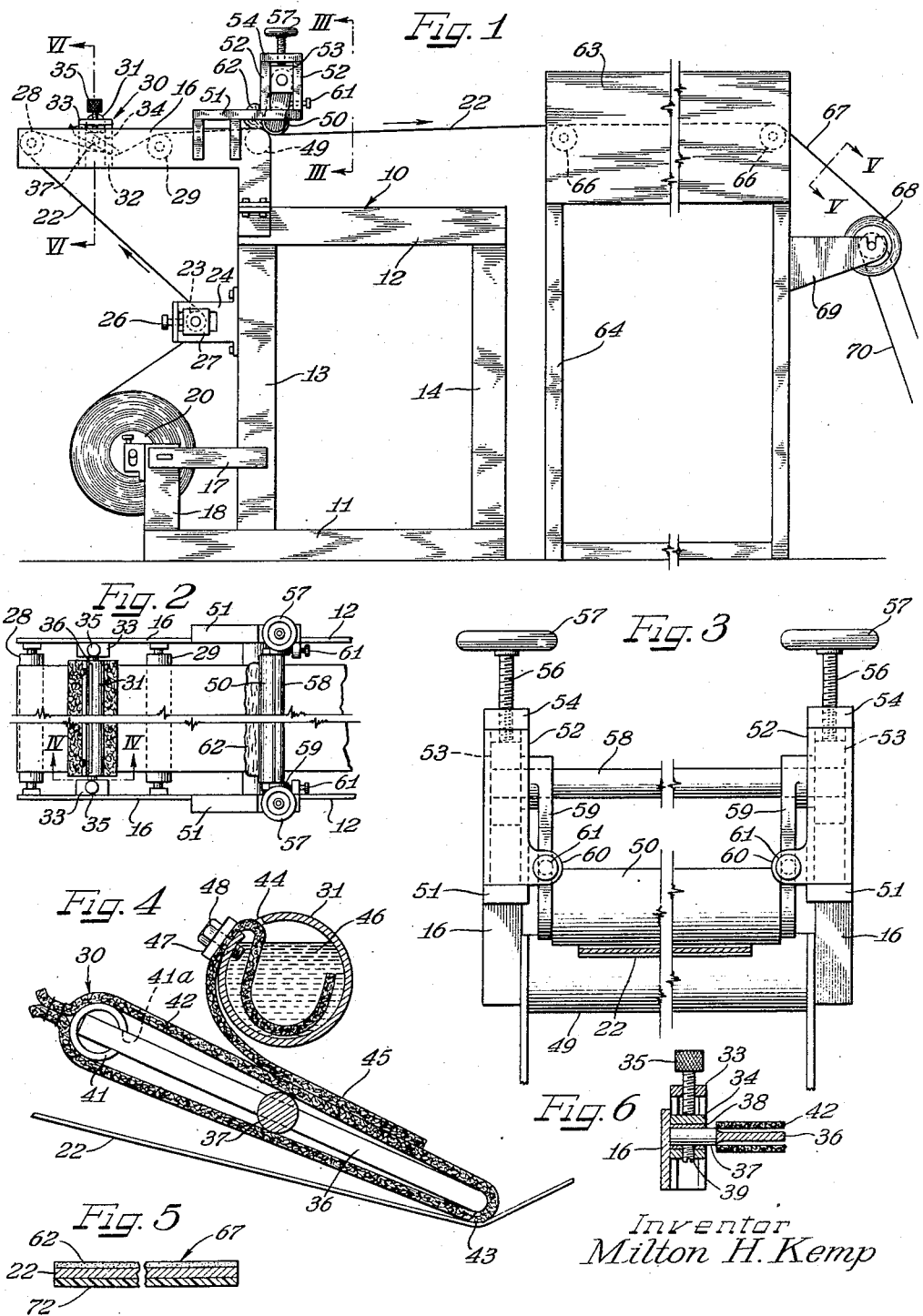
June 19, 1951 — M. H. KEMP — 2,557,227
METHOD OF MAKING ADHESIVE TAPE
Filed March 17, 1949
Inventor
Milton H. Kemp Patented June 19, 1951

UNITED STATES PATENT OFFICE 2,557,227

METHOD OF MAKING ADHESIVE TAPE

Milton H. Kemp, Michigan City, Ind., assignor to The Scholl Mfg. Co., Inc., Chicago, Ill., a corporation of New York Application March 17, 1949, Serial No. 81,954

1 Claim. (Cl. 117—60)

The present invention relates to pressure-sensitive adhesive tape and to methods of making the same, and more particularly to an improved fibrous-backed pressure-sensitive tape suitable for use as a masking tape and to methods for making the same.

This application is a continuation-in-part of my earlier filed United States application entitled "Method of Making Pressure-Sensitive Tape," Serial No. 40,498, filed July 24, 1948, and assigned to the assignee of the present invention.

In accordance with the present invention, a backing member of fibrous material, such as a sheet-like paper web, is coated with a pressure-sensitive adhesive composition by means of simple, easily conducted, continuous process. The method of the present invention contemplates the prewetting of the fibrous web with a solvent for the adhesive composition later applied thereto. The prewetted web is then coated with a pressure-sensitive adhesive to apply a continuous, uniform layer of adhesive upon one surface of the web. Following the application of the adhesive material, the coated web is dried and formed into a roll for further processing or for sale as a completed article of manufacture.

The fibrous web to which the adhesive is applied may suitably be a continuous paper web, which has preferably been well sized or impregnated with a synthetic rubber composition or like material. If desired, that surface of the web opposing the surface to which the solvent and adhesive are applied may be coated with a synthetic resin composition such as, for example, a nitrocellulose or ethyl cellulose coating composition.

I have found that, in the coating of adhesive material to a fibrous backing surface, voids and gas blisters or air bubbles may be formed during the drying operation between the adhesive and the surface to which it is applied. The formation of these bubbles or voids prevents the close adherence and bonding of the adhesive to the surface with the result that, in stripping the tape from a roll of the tape or from a surface to which the tape has been applied, the backing surface may become separated from the adhesive. This is referred to as "delamination." Delamination is prevented by the method of the present invention, in which the solvent for the adhesive material is applied to the surface prior to the application of the pressure-sensitive adhesive to that surface.

The pressure-sensitive adhesive tape of the present invention, as formed by the method hereinbefore described, comprises a backing sheet, preferably a fibrous sheet, to which an adhesive mass is secured, the mass being evenly and uniformly distributed across the surface of the fibrous backing surface. The tape is free from bubbles, blisters, voids and the like by virtue of the solvent for the mass with which the backing surface was pre-wet. The superior tape thus obtained does not become delaminated in stripping from a roll or from a surface to which it has been applied. Therefore, it is possible to prepare tape having a well-sized fibrous backing strip without the dangers of delamination in use, thus obtaining a desirable masking or similar tape having water and solvent repellent properties.

It is, therefore, an important object of the present invention to provide a method for the preparation of pressure-sensitive tape whereby a closely adherent coating of adhesive may be applied to a backing surface without the formation of bubbles or voids between the adhesive and the surface.

It is another object of the present invention to provide a method for the preparation of pressure-sensitive adhesive tape in which a fibrous backing sheet or strip is wetted with solvent prior to the application of an adhesive coating to the backing to prevent the formation during drying of voids, blisters and bubbles between the adhesive and the backing surface.

A further important object of the present invention is to provide an improved pressure-sensitive adhesive tape including an adhesive mass evenly and uniformly distributed across one surface of a fibrous backing strip.

A still further important object of the present invention is to provide an improved pressure-sensitive tape including a sized backing strip and an adhesive mass applied to the strip and uniformly and evenly distributed thereon by virtue of a solvent for the adhesive mass.

Other and further important objects of this invention will be apparent from the disclosures in the specification and the accompanying drawings, in which:

Figure 1 is a side elevational view, with parts broken away, of a coating apparatus capable of carrying out the method of the present invention;

Figure 2 is a fragmentary plan, elevational view of a portion of the apparatus of Figure 1;

Figure 3 is a view taken along the plane III—III of Figure 1;

Figure 4 is a sectional view taken along the plane IV—IV of Figure 2;

Figure 5 is a cross-sectional view taken along the plane V—V of Figure 1; and

Figure 6 is a sectional view taken along the plane VI—VI of Figure 1.

As shown on the drawings:

The reference numeral 10 refers generally to a supporting framework for supporting the coating portion of the apparatus for carrying out the method of the present invention. The frame 10 comprises a pair of spaced, horizontal, parallel members 11 and 12, the member 12 being spaced from the member 11 by means of spaced vertical uprights 13 and 14. Two such rectangular frameworks, defined by the members 11–14, inclusive, are provided in spaced relation as shown in Figure 2 to define a generally box-like supporting structure. An elbow extension 16 is provided for each of the members 12, the members 16 extending vertically above and horizontally beyond the members 12. A second support spaced beneath the extensions 16 is provided by members 17 and 18 secured to the members 13 and 11, respectively, and joined at their free ends. Members 17 and 18 serve to support a wound roll 20 of fibrous web material 22.

The web 22 is lapped about a roll 23 supported at either end in bearing blocks 27 movable within brackets 24 secured to the uprights 13 of the frame 10. The position of the roll 23 may be varied toward or away from uprights 13 by means of screws 26 to effect movement of the mounting blocks 27. Roll 23, in conjunction with the usual braking system on the supply roll 20, thus serves to maintain the web 22 under tension as it passes from the supply roll 20 through the entire apparatus. Web 22 is next passed about a guide roll 28 journaled in the support members 16 and supported therebetween as best shown in Figure 2. From the guide roll 28 the web 22 is passed over a second guide roll 29 which is likewise journaled between the members 16.

Between the guide rolls 28 and 29 the upper surface of the web is pre-wet with a suitable liquid by means of apparatus indicated generally in Figure 1 by the reference numeral 30 and illustrated in greater detail in Figure 4. The apparatus 30 comprises a cylindrical tank or reservoir 31 extending between and supported by the members 16. The supporting structure for the tank 31 comprises vertical, spaced, parallel members 32 mounted on the facing surfaces of the members 16 and extending upwardly beyond the confines thereof. The upper ends of the members 32 are connected by means of horizontal plates 33 secured to the ends of the tank 31 to support the tank in position above the web 22 passing between the rolls 28 and 29. A pair of bearing blocks 34 are mounted between members 32 and are journaled therein for adjustable vertical movement by means of screws 35.

The blocks 34, thus movably mounted on the members 16, support a generally rectangular plate or blade 36 positioned directly beneath the tank 31. A relatively short length of rod 37 is secured, as by welding to each end of plate 36, to serve as stub shafts for the plate. The rods 37 are journaled in the blocks 34, as in sleeves 38, and are capable of swivelling movement in the blocks. Means, such as set screws 39 extending into the blocks 34 and through sleeves 38 into contact with shafts 37, are provided for retaining the stub shafts 37 in adjusted position. One edge of plate 36 extends radially into a tube 41 through an elongated aperture 41a, the entire length of the rear edge of the plate 36 extending through the tube 41 to abut the interior surface of the tube.

A felt 42, having a width substantially that of the plate 36, is lapped about the framework formed by the tube 41 and the plate 36 and secured, as by sewing, to provide a felt-covered, absorbent member extending completely across the surface of the web 22. The felt 42 is in contact with the upper surface of the web 22 and is forced into engagement therewith as at 43 to maintain the web passing between the rolls 28 and 29 under tension. An elongated slit 44 extends across the entire upper length of tank 31 to provide means for filling and emptying the tank. A strip of felt 45, of a width equal to that of the felt 42, is inserted through the slit 44 into a body of liquid 46 contained within the tank 31. An elongated plate 47 extending across the length of the tank 31 is adjustably attached to the tank by means of cap screws 48. The amount of liquid absorbed by the felt 45 and passing therethrough by capillary action to the felt covering 42 may be determined by the setting of the cap screws 48 forcing the plate 47 into contact with the strip of felt 45 held against the outer surface of the tank 31. Thus, means are provided for regulating the amount of liquid 46 passed through the felt 45 into the felt 42 in contact with the web 22 as at 43.

Following the passage of the web 22 over the roller 29, the liquid wetted web passes over a stationary spreader bar 49 secured to opposing faces of the members 16 and extending therebetween. A second spreader bar is supported by the members 16 in closely spaced relation to the spreader bar 49 to define a restricted nip therebetween. The spreader bar 50 is supported by means of a pair of brackets 51 secured to the members 16 and extending thereabove. Each bracket 51 supports a pair of spaced, upright guide members 52 for receiving bearing blocks 53.

A horizontal member 54 joins the upper extremities of each pair of uprights 52, as shown in Figures 1 and 3. A screw 56 is rotatably secured to the upper surface of each block 53 and is threaded in the member 54 to provide means for moving the block 53 while guided between the members 52. A shaft 58 is journaled in each of the blocks 53 and extends therebetween for vertical movement therewith. A bracket arm 59 is secured to each extremity of the shaft 58 for rotation therewith, each of the bracket arms abutting the inside surfaces of the blocks 53. The bracket arms 59 carry at their lower portions the guiding bar 50 for contacting the upper surface of the web 22. The members 52 carry inwardly projecting ears 60 adjacent the side surfaces of the arms 59. The ears 60 are apertured to threadedly receive set screws 61 which extend through the ears 60 into contact with one edge of the depending arms 59. The arms 59 may be moved by means of the set screws 61 to determine the size of the nip aperture defined by the guiding bars 49 and 50. The tension placed upon the web 22 passing through the nip thus defined is regulated by the braking system on the supply roll 20. The set screws 56 determine the vertically adjusted position of the blocks 53 guided by the members 52, and therefore, in conjunction with the set screws 61, determine the gap at the nip.

An adhesive mass 62 is positioned at the nip defined by the guide bars 49 and 50 to be spread upon the pre-wetted surface of the web 22.

Thus, the web 22 issuing from the nip carries upon its upper surface an adhesive mass evenly spread thereon by the cooperating guide bars 59 and 50.

Following the application of the adhesive mass, the web 22 is passed through a drying chamber or oven 63 which is supported by means of a supporting frame 64 at a proper height to receive the web 22 supported by a plurality of rollers 66 mounted within the drying chamber 63. The adhesive mass, when applied to the web 22, is dried to a semi-tacky condition within the drying chamber 63 so that a completed pressure-sensitive tape in the form of a continuous web 67 issues from the drying chamber 63. The tape web 67 is wound about a driven roll 68 supported by a bracket 69 mounted on the supporting structure 64. Roll 68 is driven by means of belt 70 connected to a suitable source of power to pull the paper web through the complete coating and drying apparatus, the web being maintained under tension at all times during the manufacturing operation.

In Figure 5, the finished tape 67, following the drying operation, comprises the sized web 22 having a coating of synthetic organic film 72 applied to one surface and the layer 62 of tacky, pressure-sensitized adhesive applied to the opposite web surface. The film backing 72 is generally desirable, although not necessary to the practice of the method of the present invention.

It should be understood that the method of the present invention may be employed to prepare a pressure-sensitive tape employing any type of flexible backing material. Although I prefer to employ a paper backing, particularly in the manufacture of masking type tape, the apparatus and method herein described may be employed to prepare a tape having a felted fibrous or paper fabric backing, or other suitable flexible backing material. In the use of a paper backing, it is desirable to employ a web of well-sized paper stock, the web preferably being impregnated with a synthetic rubber composition. Such papers are preferred because of their high tearing strength, flexibility and resistance to penetration by lacquer solvents.

In some applications, it has been found to be desirable to employ a paper or other fibrous backing material having one surface coated with a synthetic organic film 72, such as nitro cellulose, ethyl cellulose, or other synthetic resin films. This type of flexible backing is desired for its improved weather-resistant characteristics and for the prevention of blocking or sticking of the tape when supplied and stored in superimposed stacks or rolls.

The adhesive composition 62 applied to the tape may be any one of several normally tacky adhesives which are conventionally used in commercial pressure-sensitive tape. For example, I have found the following composition to be satisfactory for use as the adhesive mass to be applied to the web 22 as hereinbefore described:

| Component | Parts by Weight |
| --- | --- |
| Vistanex B 100 | 500 |
| Piccolyte S 100 | 350 |
| Mineral Oil | 200 |
| Naphtha | 2,000 |

Vistanex is a trade name employed to identify isobutylene type polymers made, for example, according to U. S. Patent No. 2,051,840. Piccolyte is a trade name of a hydrogenated terpene polymer, such as polymerized betapinene, prepared as generally set forth in U. S. Patent No. 2,249,112.

The liquid employed to pre-wet the web 22 as by means of the apparatus 30 is preferably an organic solvent such as toluol, an aliphatic naphtha such as "textile" spirits having a boiling range of from 150 to 201° F., or a commercial solvent sold under the trade name "Ennjay I" which is a petroleum aromatic solvent having a boiling range from 209 to 242° C. I have found that the application of about 0.022 pound of solvent per square yard of web, or less, is sufficient to give a very slight wetting of the web with the solvent. Undesirable voids, blisters and air bubbles during drying in the oven, are thereby eliminated.

The function of the solvent and the purpose of the pre-wetting step prior to the application of the adhesive composition to the web have been described above and result in the elimination of air bubbles, blisters or voids, during the drying step, between the surface of the web 22 and the adhesive mass applied to that surface. It should be understood that the solvent has no mutual dissolving action upon the web and the adhesive and that the improved tape is obtained by the elimination of voids or air bubbles between the adhesive and the web. The resulting smooth coating of adhesive applied to the web surface adheres very tenaciously to the web and will not become delaminated during the removal of the tape from a surface to which it has been applied.

Thus, it may be seen that the present invention provides an improved pressure-sensitive adhesive tape. The tape of the present invention is free from the danger of delamination during use and removal due to the close adherence of the adhesive to the web. This close adherence is due to the smooth, uniform distribution of the adhesive upon the back strip, the finished tape being free from bubbles, blisters, voids and the like. In this manner, it is possible to obtain an extremely desirable adhesive tape by the coating of a well-sized backing strip, and the tape thus obtained possesses improved weather and wear resistance due to the employment of the sized backing strip. Also, it is possible to obtain an improved adhesive tape including a well-sized fibrous backing strip having a synthetic organic film applied to one strip surface and pressure-sensitive adhesive applied to the other strip surface. These advantages residing in the improved tape of the present invention will be appreciated by those skilled in the art, and the substantial improvement thus obtained over the prior art tape structures will be readily understood.

It will, of course, be understood that various details of construction may be varied through a wide range without departing from the principles of this invention, and it is, therefore, not the purpose to limit the patent granted hereon otherwise than necessitated by the scope of the appended claim.

I claim as my invention:

In the method of applying a layer of a tacky adhesive material to a surface of a fibrous web, the improvement whereby voids, blisters and air bubbles are eliminated from the applied layer, which comprises passing a moving surface of said web while under tension against an absorbent mass wetted with a solvent for said adhesive material to pre-wet said fibrous web with not over 0.022 pound of said solvent per square yard of said web and immediately thereafter applying said tacky adhesive material to said pre-wet web surface.

MILTON H. KEMP.

REFERENCES CITED

The following references are of record in the file of this patent:

UNITED STATES PATENTS

| Number | Name | Date |
|---|---|---|
| 929,651 | Bayne et al. | Aug. 3, 1909 |
| 1,236,959 | McIntosh | Aug. 14, 1917 |
| 1,899,535 | Teague | Feb. 28, 1933 |
| 2,349,508 | Mack | May 23, 1944 |
| 2,458,166 | Homeyer | Jan. 4, 1949 |

OTHER REFERENCES

"Chemical and Metallurgical Engineering," vol. 35 of 1928, page 306.